March 24, 1931.  O. U. ZERK  1,797,893
TRIPOD
Filed Sept. 9, 1925
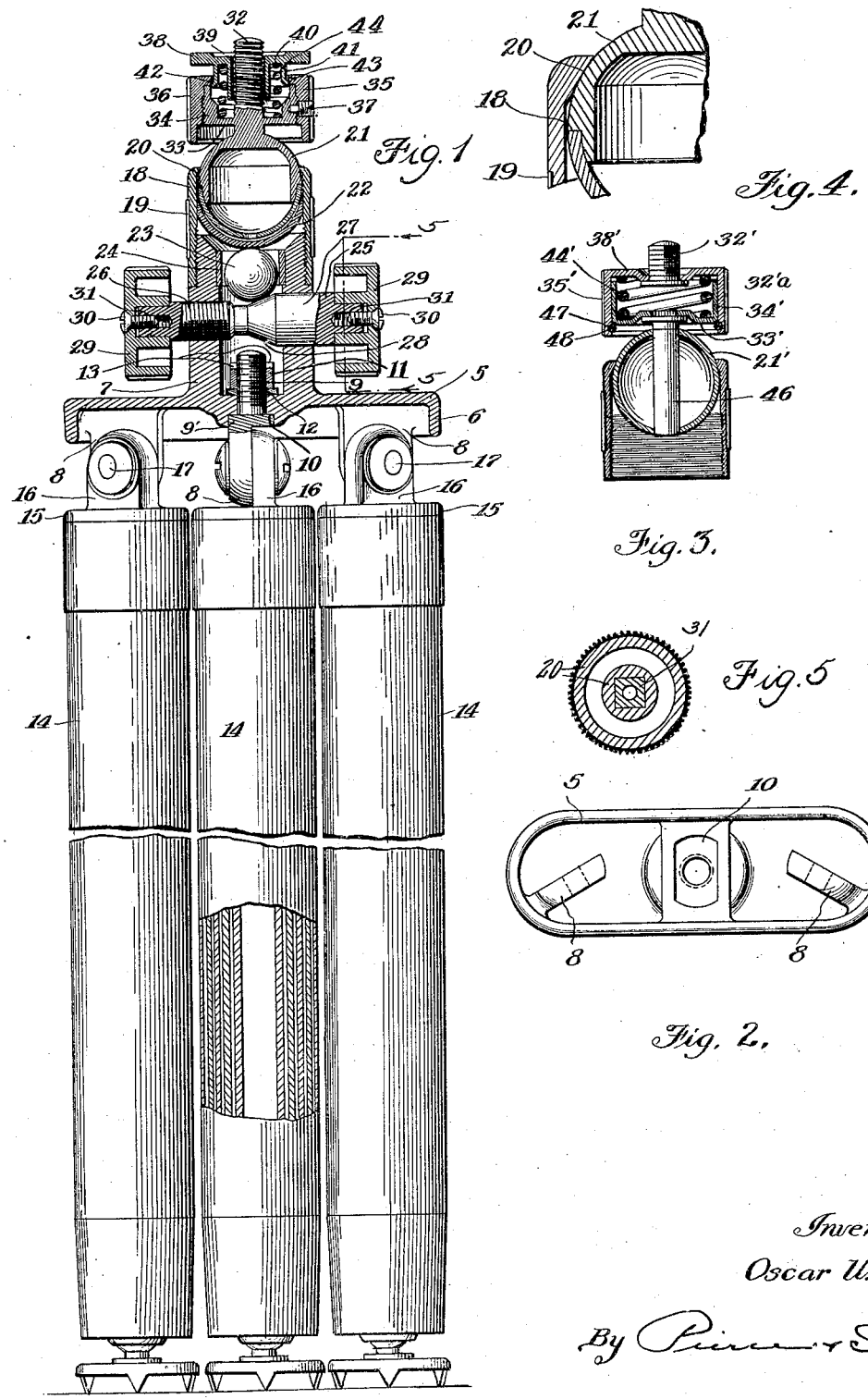
Inventor
Oscar U. Zerk
By Pierce & Sweet
Attys.

Patented Mar. 24, 1931

1,797,893

UNITED STATES PATENT OFFICE

OSCAR U. ZERK, OF CHICAGO, ILLINOIS

TRIPOD

Application filed September 9, 1925. Serial No. 55,351.

My invention relates to improvements in tripods, and is particularly concerned with improvements in tripods for supporting cameras, motion picture cameras, surveying instruments, range finders, etc.

The objects of my present invention are:

First, to provide a tripod including a novel head construction enabling the operator to mount a camera or other instrumentality upon the tripod in such manner as to either swing freely about a given axis, or to be held in any of its adjusted positions by frictional contacting means, or to be locked solidly in any of its adjusted positions.

Second, to provide a tripod comprising means whereby the camera may be tipped from the vertical through any angular adjustment within the limits of the construction and rigidly held in such adjusted position.

Third, to provide a tripod comprising means for making a rigid connection with a camera or other instrumentality without scratching the surface of the camera with which the locking means contacts.

Fourth, to provide a tripod such as described, in which all the parts, including the legs, can be brought into the same plane so as to form a compact arrangement for carrying purposes, and Finally, to provide a tripod of the character described, that is comparatively simple in construction, economical to manufacture, and easy to operate.

Other objects of my invention will become apparent as this description progresses, reference being had to the accompanying drawings, in which Figure 1 is a side elevation of a tripod embodying my invention, Figure 2 is a bottom view of the head, Figure 3 is a central longitudinal section of a modified form of a portion of my invention, Figure 4 is an enlarged sectional detail of a portion of the construction shown in Figure 1, and Figure 5 is a cross section taken on the line 5—5 of Figure 1.

Referring to the drawings, my improved tripod comprises an elongated plate 5 having the depending flange 6 and the upwardly extending, hollow, cylindrical boss 7 formed integrally therewith. A hinge lug 8 extends downwardly from each end of the plate 5. A bolt 9 extends through the plate 5 and into the hollow boss. This bolt has a head 9' conformed to, and fitting in, the depression 10 in the lower side of the plate so as to prevent it from rotating, and is clamped to the plate by means of the nut 11, a lock washer 12 being interposed between the nut and the plate. Slots 13 are formed in the upper end of the nut to facilitate tightening or loosening it by means of a special tool provided with bifurcations adapted to be inserted in the slots. The head 9' of the bolt is extended downwardly to form a third hinge lug 8. A leg 14, formed of telescoping pipe sections, has a header 15 at its upper end that terminates in a hinge lug 16 pivotally connected with the corresponding hinge lug 8 by means of a bolt 17.

The construction of the legs forming a part of this tripod may be conventional in character, or similar to that disclosed in my copending application, Serial No. 55,350, filed of even date herewith and now a Patent, No. 1,672,596, of June 5, 1928, and the same comment applies to the means for pivotally connecting the legs with the head.

A sleeve 18 externally knurled, as shown at 19, is threaded onto the upper end of the boss 7, and extends therebeyond. The upper end of this sleeve is turned inwardly and beveled or curved, as shown at 20, to provide a seat smaller in diameter than the external diameter of the ball 21. The internal diameter of the sleeve 18 is slightly larger than the external diameter of the ball 21, as shown in Figure 4, so as to prevent the ball from wedging in the sleeve. This ball is preferably formed in two pieces, as shown, to facilitate its manufacture and to lighten it, the pieces being soldered or otherwise secured together.

For holding the ball in frictional contact with the seat 20, I provide the bowl-shaped follower 22. The diameter of the curvature of the inner face of this bowl is less than the diameter of the curvature of the ball, as a result of which the contact between the ball and the follower is adjacent the outer edge of the latter only. This enables the operator easily to develop sufficient frictional contact between the follower and the ball to hold the latter in any of its adjusted positions.

For holding the follower in contact with the ball, I provide another ball 23 of considerably smaller diameter and preferably solid, which is slidable in a hardened steel sleeve 24, positioned in the upper end of the boss 7. A screw 25 extends through opposite walls of the boss 7. This screw comprises two parts 26 and 27, the smaller of which is in screw-threaded engagement with one wall of the boss 7 as shown in Figure 1. Intermediate these two parts is a conical portion 28 for contacting with the ball 23. The screw can be turned by means of knobs 29 secured to the opposite ends thereof, these knobs having a diameter substantially equal to the width of the head-plate 5, and being secured to the ends of the screw 25 by means of set-screws 30. The inner faces of the knobs are provided with recesses 31 for receiving the ends of the screw. Preferably each end of the screw is flattened on both sides or squared as shown in Fig. 5 to engage correspondingly-shaped portions of the wall of the recess 31.

From the above description, it will be apparent that when the screw 25 is turned in the proper direction the screw will move so as to push upwardly the ball 23 and thus force the follower 22 into contact with the ball 21, thereby locking the latter in any desired position.

A screw 32 projects upwardly from the ball 21 and has formed integrally therewith the web 33 and the angular externally threaded flange 34, the latter being spaced away from the screw 32. A sleeve 35 is threaded onto the flange 34 and externally knurled, as indicated at 36. Preferably, this sleeve is secured to the flange 34 by means of a set-screw 37.

A contact disc 38, recessed as shown at 39, surrounds the screw 32 and is freely slidable thereon. This contact disc has an inner and an outer cylindrical boss 40 and 41, respectively, the first of which surrounds the screw 32 and acts as a guide, while the latter has an outwardly flared portion 42 that engages the beveled surface 43 of the sleeve 35. A strong compression spring 44, confined between the web 33 and the contact disc 38, provides means for yieldingly holding the contacting portions of the boss 41 and the sleeve 35 in engagement, and also acts as one element of a friction clutch inasmuch as one end of it frictionally engages the contact disc 38, and the other end frictionally engages the web 33 in such manner that when the contact disc 38 is rotated by the rotation of the camera or other device supported by the tripod, this frictional contact will exert a drag upon the contact disc. This frictional contact is also useful in that it can be relied upon in most cases to lock the contact disc in any of its angularly adjusted positions.

In the operation of my improved tripod, the following methods may be used in order to secure a camera or other device to it. In securing a camera for taking still pictures to the tripod, the screw 27 is first loosened so as to permit the ball 21 freely to move in its seat. The sleeve 35 is then positioned so as to bring the screw 32 into registry with the threaded socket in the camera, and then rotated until the screw 32 has been threaded inwardly sufficiently to bring the contact disc 38 into contact with the camera and with the upper end of the sleeve 35, thereby rigidly locking the camera to the screw. The camera is then preferably brought to a level position and the knobs 29 turned to lock the ball 21 in the sleeve 18. The camera is then turned counter-clockwise one complete revolution, and from this position it can be turned to any position desired, because it is now free to move through an angle of 360°. If the camera is to be tilted, this can be accomplished by loosening the screw 27, tilting the camera as may be desired, and then tightening the screw 27.

The contact disc 38 remains in frictional contact with the camera during two complete revolutions of the camera so that it is possible to make any desired angular adjustment of the camera with respect to the axis of the screw 32. The camera may be turned so far onto the screw 32 as to bring the contact disc 38 tightly into contact with the upper end of the sleeve 36 and thereby lock the camera to the screw.

To secure a motion picture camera to the tripod, the same operations as described above will be gone through when the pictures are to be taken in one direction, but when panoramic views are taken, the camera is turned through any part of the two complete revolutions referred to above under control of the friction between the contact disc 38, spring 44 and web 33. This rotation may take place in either clock-wise or counter-clock-wise direction. The same operations will, of course, be used in taking panoramic views with the usual panoramic camera.

From the above description, it will be apparent that in securing the camera to the tripod, at least three stages are passed through. In the first stage, the camera is freely rotatable upon the screw 32 because it has not as yet come into contact with the contact disc 38. This adjustment enables the screw 32 to be freely screwed into the camera. Still or panoramic pictures during this operation are possible, but not advisable on account of unavoidable play between the screw 32 and the threaded socket of the camera. In the second stage, the contact disc 38 has contact with a side or surface of the camera adjacent the threaded socket in the camera, but the contacting surfaces of the friction disc 38 and the spring make it possible for the operator to take either panoramic pictures by turning the camera without danger of vibration of the camera as might happen in the first stage described above, or to adjust the camera about the axis of the screw 32 and lock it in position by the frictional engagement of these two contacting elements. In the third stage, the camera is rigidly locked to the screw 32.

It will be apparent that if it is desired to tilt the camera to the horizontal, it may happen that the camera and tripod are so positioned that the camera will render one of the knobs 29 inaccessible. At the same time the other knob will be rendered more accessible, so that the camera will not at any time be so positioned that the operator cannot turn the screw 27. Furthermore, the two knobs 29 are of use in that they enable both hands of the operator to be used at the same time to exert pressure on the screw 27, thereby making it more easy to lock the ball 21 in its adjusted positions.

In that embodiment of my invention disclosed in Figure 3, the screw 32' extends through the contact disc 38' and has a head 32'a that is brazed or otherwise secured to the contact disc. A sleeve 35' is formed integrally with the contact disc 38' and extends downwardly therein to enclose the annular flange 34' carried by the web 33'. A stem 46 is soldered or otherwise secured to the web 33' and extends through both sides of the ball 21', which can be made in one or more pieces as may be expedient, the stem being brazed or otherwise secured to the walls of the ball. A split ring 47 sprung into a groove 49 adjacent the bottom of the inner wall of the sleeve 35' provides means for preventing the separation of the sleeve 35' and the flange 34'. A strong compression spring 44', confined between the contact disc 38' and the web 33', provides means for yieldingly holding the bottom of the web 33' in frictional contact with the ring 47, so that in this embodiment of my invention there is frictional contact between the contact disc 38' and one end of the spring, and between the web 33' and the ring 47, which can be used for frictionally locking the camera in any of its adjusted positions.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A head for a tripod comprising a plate having a central, hollow, cylindrical boss extending upwardly therefrom, a sleeve secured to said boss and projecting upwardly therebeyond, the inner wall of the upper end of said sleeve being conformed to provide a seat, a ball within said sleeve, and means for holding said ball on said seat comprising a follower contacting near its edges only with said ball, a second ball reciprocable in said hollow boss, a screw extending through said hollow boss and having screw threaded engagement with one wall of said boss, said screw having a cone-shaped portion for contacting with said last named ball for urging it against said follower.

2. A head for a tripod comprising a plate having a hollow boss projecting upwardly therefrom, a sleeve secured to said boss and projecting upwardly therebeyond, a ball confined in said sleeve and having means for making a detachable connection with a device to be supported, and means for locking said ball in adjusted position comprising a screw passing through the walls of said boss and having threaded engagement with one of said walls, and a second ball for transmitting the locking pressure from said screw to said first named ball.

3. A universally adjustable support comprising a substantially spherical member having means for attachment of an object to be supported, an inwardly flanged sleeve fitting around said member, the diameter of the opening in the flange on said sleeve being less than the diameter of said member, a concave disc slidable in said sleeve and engageable with said member, the radius of curvature of said disc being less than the radius of said member, and means for forcing said disc against said member thereby to clamp said member between said disc and said flange, said means comprising a ball guided for longitudinal movement in said sleeve and engageable with the convex surface of said disc, and means for forcing said ball against said disc.

In witness whereof I hereunto subscribe my name this 5th day of September, 1925.

OSCAR U. ZERK.